United States Patent [19]

Ikemori

[11] 4,432,615
[45] Feb. 21, 1984

[54] ZOOM LENS

[75] Inventor: Keiji Ikemori, Kanagawa, Japan

[73] Assignee: Canon Kabushiki Kaisha, Tokyo, Japan

[21] Appl. No.: 274,665

[22] Filed: Jun. 17, 1981

[30] Foreign Application Priority Data

Jun. 19, 1980 [JP] Japan ................................ 55-83065

[51] Int. Cl.$^3$ ............................................. G02B 7/11
[52] U.S. Cl. ..................................... 350/427; 350/449; 350/450
[58] Field of Search ............... 350/426, 427, 449, 450, 350/423

[56] References Cited

U.S. PATENT DOCUMENTS

| | | | |
|---|---|---|---|
| 2,663,223 | 12/1953 | Hopkins | 350/427 |
| 3,094,581 | 6/1963 | Back | 350/423 |
| 3,353,891 | 11/1967 | Rosenberger | 350/427 |
| 4,159,865 | 7/1979 | Kawamura et al. | 350/426 |

Primary Examiner—Bruce Y. Arnold
Assistant Examiner—Paul M. Dzierzynski
Attorney, Agent, or Firm—Toren, McGeady and Stanger

[57] ABSTRACT

A zoom lens includes a number of lens groups in which the first lens group, counting from the front, is movably adjustable for focusing. A stop is arranged at the rear of the zooming lens groups for movement forwardly together with the first lens group upon focusing down to shorter object distances. Accordingly, added compactness of the entire lens system is achieved, while high grade imagery is preserved throughout the extended focusing range.

5 Claims, 33 Drawing Figures

ZOOM LENS

BACKGROUND OF THE INVENTION

1. Field of the Invention

This invention relates to zoom lenses in which the first lens group, counting from the front, is adjustable for focusing and more particularly to a zoom lens of high standard optical performance in which the first lens is group reduced in outer diameter to improve the compactness of the lens system.

2. Description of the Prior Art

In general, it is desirable that zoom lenses be capable of closeup photography and of taking the compact form. This is because a close object can be advantageously imaged over the entire area of the picture frame, and because the use of the compact form lightens the weight of the camera and improves its manageability. In the prinicipal types of zoom lenses, an extension of the focusing range to closer object distances calls for an increase in the total forward movement of the focusing lens group. The result is that the outer diameter of the focusing group must be correspondingly increased, since the light ray from the maximum possible half-angle of view field passes through the lens surfaces of the first lens group at increasing heights from the optical axis, as the total forward movement of the focusing lens group increases.

The maximum diameter of all of the lens groups constituting a zoom lens occurs, in many cases, at the first group arranged for the focusing function. To facilitate an improvement of the compactness of the lens, therefore, it is required to reduce the outer diameter of the first lens group. In general is it true that when the power of every lens group constituting the zoom lens is strengthened, the outer diameter of the first lens group can be reduced to some extent. As the power of each lens group increases, however, the variation of the aberrations upon zooming is increased, giving rise to a serious problem when in practical use. Therefore, a much desired increase in the power of each lens group cannot be made. An alternate solution is that a particular type of zoom lens suited for a minimization of the outer diameter of the first lens group is employed, comprising two groups of opposite power, the negative one of which precedes the positive. Since this type of lens is advantageous in achieving a good state of correction of aberrations on the wide angle side, it has found wide use in wide-angle zoom lenses. But, as the zoom ratio increases, the high grade imagery is made more difficult to preserve at the telephoto settings, and further on the point of view of the aberrational problem, it is difficult to be compatible with an increase of the relative aperture.

As an effective method of minimizing the outer diameter of the first lens group, mention may be made of that disclosed in U.S. Pat. No. 4,159,865 where the stop is made movable along with the zoom groups, with an advantage that the bulk and size of the zoom lens as a whole is reduced.

SUMMARY OF THE INVENTION

It is an object of the present invention to provide a zoom lens in which the frontmost lens group that necessitates a largest diameter in many cases is shortened in the diametrical direction, while still preserving high grade imagery with an advantage that the compactness of the zoom lens as a whole is improved.

In more detail, the zoom lens of the present invention has the first lens group counting from the front arranged for focusing, and a stop arranged at the rear of the zoom groups to cooperate with the aforesaid first or focusing lens group, so that forward axial movement of the stop along with the focusing lens group permits the outer diameter of the focusing lens group to be shortened, thus accomplishing the object of the present invention.

According to a specific embodiment of the present invention which will be described later as applied to one of the principal types of zoom lenses, it is made possible to achieve a minimization of the outer diameter of the first lens group and to provide a zoom lens having a zoom ratio of 1:2.5 to 1:2.8 with a constant relative aperture of f/3.5 throughout the range, and of which the distortion and astigmatism are well corrected throughout, particularly in the wide angle positions for a high standard of imaging performance.

BRIEF DESCRIPTION OF THE DRAWINGS

FIGS. 4(a1) to 4(a4), 4(b1) to 4(b4) and 4(c1) to 4(c4) are graphic representations of the various aberrations of the zoom lens of FIG. 3 in the wide angle, intermediate and telephoto positions respectively.

FIGS. 6(a1) to 6(a4), 6(b1) to 6(b4) and 6(c1) to 6(c4) are graphic representations of the various aberrations of the zoom lens of FIG. 5 in the wide angle, intermediate and telephoto positions respectively.

DETAILED DESCRIPTION OF THE PREFERRED EMBODIMENTS

In FIGS. 1(a) to 1(d) there are shown embodiments of the present invention applied to the principal types of zoom lenses where in any case the focusing provision is made at a frontmost lens group F, and a stop S is located in rear of a variable magnification optical system in groups V and C. It is noted that in the zoom lens of FIG. 1(d) the focusing group F also serves to constitute part of the variable magnification optical system. The present invention is directed toward such form and arrangement and construction of the lens group which constitute the zoom lens, that the axial air separation between the stop S and that lens group which lies just in front of the stop S, or lens group C (in FIG. 1(d) lens group V) is widened when zoomed to wide angle settings, and narrowed when zoomed to telephoto settings. When closeup shooting is to be performed in the wide angle positions, the focusing lens group F is moved forward while simultaneously moving the stop S forward, thereby giving an advantage that the frontmost lens group having the focusing function is effectively shortened in the diametrical direction. Next explanation is given to the relationship of the zoom lens group with the arrangement of the stop S.

Figure 1A:
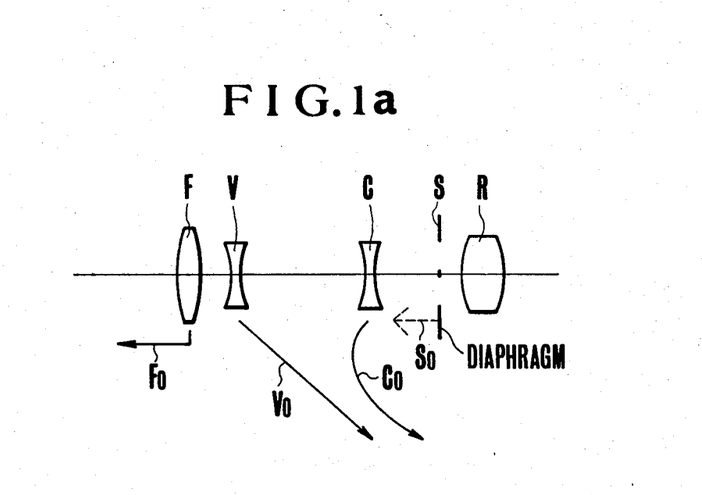
FIGS. 1(a) to 1(d) are schematic diagrams of four different principal types of zoom lenses to which the present invention is applicable respectively.

FIG. 1(a) shows a four-component zoom lens of the type having a distribution of positive, negative, negative and positive powers in this order from the front. The figure shows the front or focusing lens group F; lens groups V and C movable for zooming with their traces as shown by a straight line Vo and a curved line Co respectively, constituting a variable magnification optical system; a stop S arranged to be movable along with the focusing lens group F as shown by a dashed line So; and a relay lens R. In order to focus the zoom lens in the wide angle setting on a close object, the focusing lens group F is moved forward as shown by an arrow Fo, and at the same time the stop S is also moved forward to a position near the compensator C. Since, the telephoto setting, the compensator C is nearer to the stop S, as focusing is effected to a close object the stop S has, despite the adequate forward movement of the focusing lens group, to be moved not so much forward.

Figure 1B:
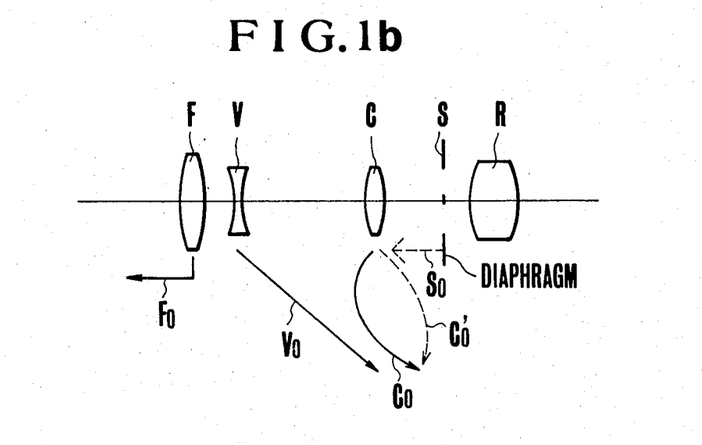

FIG. 1(b) shows a four-component zoom lens of the type having a distribution of positive, negative, positive and positive powers in this order from the front, where the same reference characters have been employed to denote the similar parts to those shown in FIG. 1(a). This zoom lens is different from that of FIG. 1(a) in that one component of the variable magnification optical system or the compensator C is of positive power. Because of this, the variator V of negative power and the compensator C of positive power are moved axially in such differential relation to each other that while the variator V proceeds in one way as shown by a straight line Vo, the compensator of positive power C takes a track as represented by either one of convex and concave curves Co and Co' respectively depending upon the value of focal length of the compensator C. The fact that the air separation between the compensator C and the stop S is wider in the wide angle setting, than in the telephoto setting is the same as in the type of zoom lens shown in FIG. 1(a). This air separation allows for movement of the stop S as shown by an arrow of dashed line So as the focusing component F is moved.

Figure 1C:
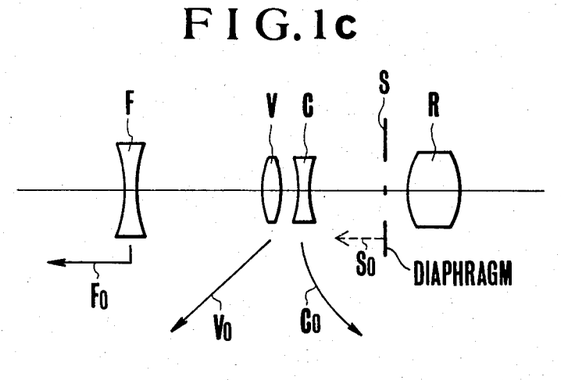

FIG. 1(c) shows a four-component zoom lens of the type having a distribution of negative, positive, negative and positive powers in this order from the front, where the same reference characters have been employed to denote the similar parts to those shown in FIG. 1(a). The focusing component F consists of a negative lens, and the variable magnification optical system consists of a positive lens V and a negative lens C. To effect a change in magnification of the object, the positive component V and the negative component C are moved axially in such differential relation to each other as shown by a straight line Vo and a curved line Co respectively. The fact that the air separation between the negative component C and the stop S is wider in the wide angle position than in the telephoto position, is the same as in the types of zoom lenses shown in FIGS. 1(a) and 1(b). In the wide angle postitions, the stop S is moved as shown by an arrow of dashed line So as the focusing component moves forward.

Figure 1D:
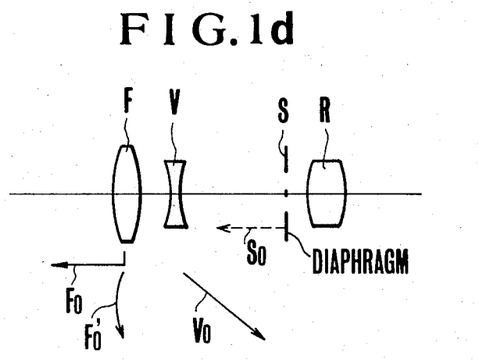

FIG. 1(d) shows a three-component zoom lens of the type having a distribution of positive, negative and positive powers where the same reference characters have been employed to denote the similar parts to those shown in FIG. 1(a).

The focusing component F serves to perform the magnification varying function together with the negative component V. The negative component V is moved as shown by a straight line Vo, while the focusing component F is simultaneously moved as shown by a curved line Fo', to effect a change in magnification of the object. The air separation between the negative component V and the stop S is sufficiently wide in the wide angle positions to allow for movement of the stop S as shown by an arrow of dashed line So as the component F is moved forward to effect focusing.

Figure 2A:
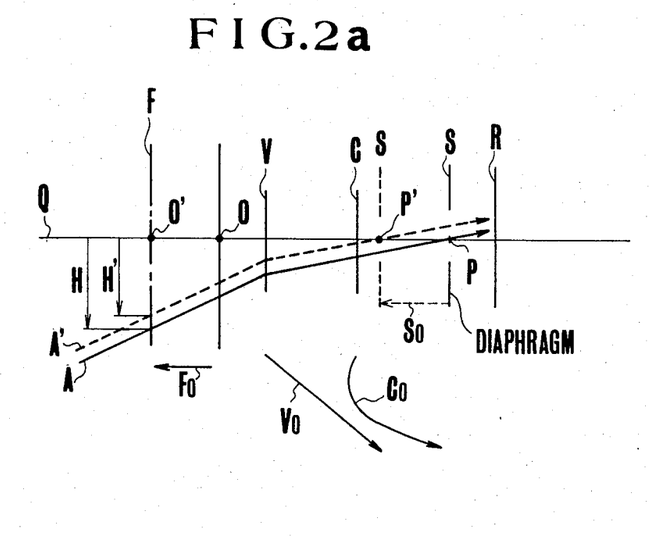
FIGS. 2(a) to 2(c) are diagrams of geometry considered to define design parameters of a zoom lens of the invention in three different zooming methods respectively.

The imparting of forward movement into the stop S can lead to shorten the diameter of the front component F. This should be explained in more detail in connection with the type of zoom lens shown in FIG. 1(a) by reference to FIG. 2. In FIG. 2(a), the first lens component having the focusing function is indicated at F, the second lens component having the focal length varying function at V, the third lens component having the image shift compensating function at C, and the fourth lens component having the image forming function which is stationary during zooming at R, with the stop arranged in a space between the 3rd component C and the 4th component R being indicated at S. When shooting an object at a finite distance, the 1st component F is moved from a point of position 0 for an infinitely distant object to a point 0', thus focusing the zoom lens. If, at this time, the stop S is located at a point P, a light ray from the maximum possible half-angle of view field impinges on the 1st lens component F at a height H measured from an optical axis Q. Alternately, assuming that the stop S is shifted to a point P' nearer to the component C at a time when the 1st component F is moved forward, then the height H' at which the light ray A' of the maximum possible field half-angle impringes on the 1st component F is made to decrease from the height H. Therefore, the provision of moving the stop S can decrease the diameter of the 1st lens component F by 2(H—H').

The reason why the present invention is applied to the types of zoom lenses in which the air separation between the stop S and its preceding lens component is wider in the wide angle settings than in the telephoto settings is explained below by reference to FIGS. 2(b) and 2(c).

Figure 2B:
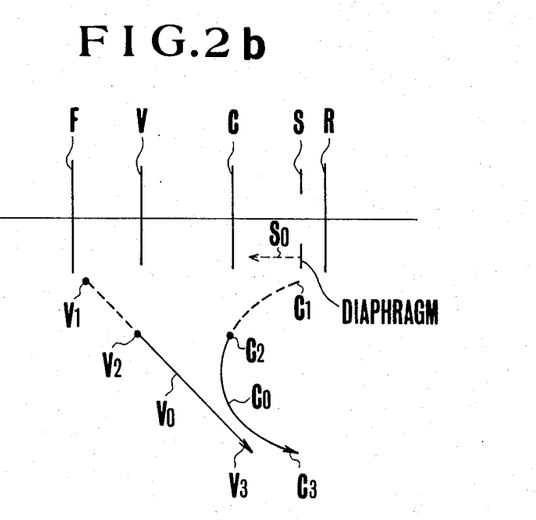
Figure 2C:
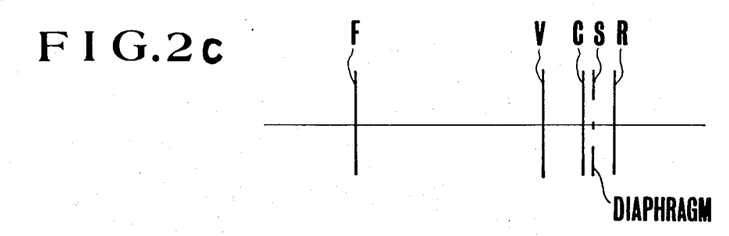

FIGS. 2(b) and 2(c) show a zoom lens in the wide angle and telephoto settings respectively where the characters F, V, C, R and S represent the similar parts to those of the same characters in FIG. 2(a). In FIGS. 2(b) there are given a straight line Vo and a curved line Co showing variations with time of the axial positions of the 2nd and 3rd components V and C during zooming respectively. Fractions of the lines Vo and Co ranging from a point V2 to a point V3, and from a point C2 to a point C3, are selected for the assurance of a prescribed zoom ratio. Since in the wide angle position of FIG. 2(b) the air separation between the 3rd lens component C and the stop S is very wide, the amount of forward movement of the stop S which occurs with forward movement of the 1st lens component F can be made adequate as shown by dashed line arrow So. But in the telephoto position of FIG. 2(c), the air separation between the 3rd lens component C and the stop S with object at infinity is so short as to leave little room for movement of the stop during focusing. However, the maximum diameter of the 1st lens component is determined in a many cases not by the light path in the telephoto position but by the path of the light ray of the maximum possible half-angle of view field near or at the wide angle position as will be seen from the numerical data of practical embodiments of the invention to be described later. To achieve an improvement of the compactness of the zoom lens, therefore, provision for a means of causing the diameter of the 1st lens component to be shortened on the wide angle side suffices. On this account, those types of zoom lenses which can be arranged to assure an adequate air space for movement of the stop S in the wide angle positions are selected for employment of the form of the invention.

Such types of zoom lenses may be rendered operative in a zooming range not as much extended as to points V1 and C1 in the lines Vo and Co, but limited to the points V2 and C2 at which the air separation between the 3rd component C and the stop S starts to be sufficiently large. The limitation of the wide angle side of a zooming range to the points V2 and C2 gives an advantage that a relatively good stability of aberration correction can be maintained throughout the zooming range.

Two examples of specific zoom lenses of the type described in connection with FIG. 1(a) will next be shown, for the construction and arrangement of the lens elements constituting the zoom lens in accordance with the present invention. Any of the specific zoom lenses comprises, likewise as in FIG. 1(a), from front to rear, a first group of lens elements of positive power movable for focusing but which remains stationary during zooming, a second group of lens elements of negative power having the magnification changing function, a third group of lens elements of negative power having the image shift compensating function followed by a stop, and a fourth group of lens elements which remains stationary during zooming, the air separation between the 3rd and 4th groups being wider in the wide angle positions than in the telephoto positions, a condition that $f_1 > e - 2f_2$ being fulfilled where $f_1$ and $f_2$ are the focal lengths of the 1st and 2nd lens groups respectively, and e is the interval between the principal points of the 1st and 2nd lens groups, and the stop being moved toward the 3rd lens group as the 1st lens group is moved forward to effect focusing down to shorter object distances.

Numerical Example 1 (FIG. 3)
Focal Length f = 51.3–131.5 F-number: 1:3.5
Image Angle 2ω = 45.8°–18.6°

Figure 3:
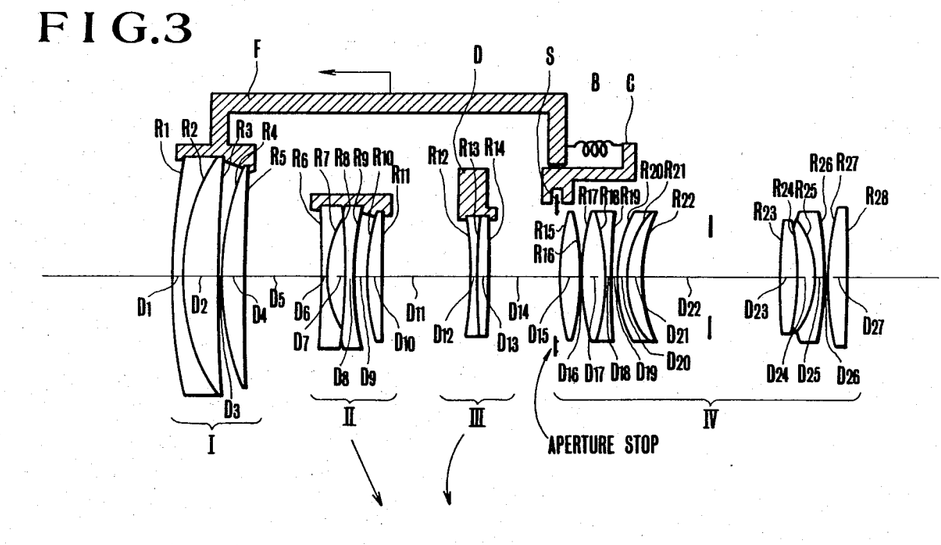
FIG. 3 is a longitudinal sectional view of an Example 1 embodiment of the present invention, with the schematic illustration of a linkage between the first lens group and the stop.

| Radius of Curvature | | Axial Thickness & Air Separation | | Refractive Index (Nd) | | Abbe Number (νd) | |
|---|---|---|---|---|---|---|---|
| $R_1$ | 105.47 | $D_1$ | 2.65 | $N_1$ | 1.80518 | $\nu_1$ | 25.4 |
| $R_2$ | 50.9225 | $D_2$ | 7.4 | $N_2$ | 1.65844 | $\nu_2$ | 50.9 |
| $R_3$ | 264.5 | $D_3$ | 0.15 | | | | |
| $R_4$ | 72.878 | $D_4$ | 5. | $N_3$ | 1.6968 | $\nu_3$ | 55.5 |
| $R_5$ | 712.136 | $D_5$ | Variable | | | | |
| $R_6$ | −443.3 | $D_6$ | 1.7 | $N_4$ | 1.7725 | $\nu_4$ | 49.6 |
| $R_7$ | 25.942 | $D_7$ | 4.691 | | | | |
| $R_8$ | −109.4 | $D_8$ | 1.6 | $N_5$ | 1.7725 | $\nu_5$ | 49.6 |
| $R_9$ | 75.402 | $D_9$ | 1.88 | | | | |
| $R_{10}$ | 45.2119 | $D_{10}$ | 3.6 | $N_6$ | 1.80518 | $\nu_6$ | 25.4 |
| $R_{11}$ | −891.83 | $D_{11}$ | Variable | | | | |
| $R_{12}$ | −70. | $D_{12}$ | 1.3 | $N_7$ | 1.60311 | $\nu_7$ | 60.7 |
| $R_{13}$ | 146.56 | $D_{13}$ | 2. | $N_8$ | 1.60342 | $\nu_8$ | 38. |
| $R_{14}$ | −315.75 | $D_{14}$ | Variable | | | | |
| $R_{15}$ | 68.936 | $D_{15}$ | 3.9 | $N_9$ | 1.6968 | $\nu_9$ | 55.5 |
| $R_{16}$ | −92.5 | $D_{16}$ | 0.15 | | | | |
| $R_{17}$ | 58.2631 | $D_{17}$ | 4.838 | $N_{10}$ | 1.48749 | $\nu_{10}$ | 70.1 |
| $R_{18}$ | −48.07 | $D_{18}$ | 1.4 | $N_{11}$ | 1.7495 | $\nu_{11}$ | 35.3 |
| $R_{19}$ | 273.93 | $D_{19}$ | 0.15 | | | | |
| $R_{20}$ | 26.228 | $D_{20}$ | 2. | $N_{12}$ | 1.7552 | $\nu_{12}$ | 27.5 |
| $R_{21}$ | 20.342 | $D_{21}$ | 4.488 | $N_{13}$ | 1.48749 | $\nu_{13}$ | 70.1 |
| $R_{22}$ | 53.45 | $D_{22}$ | 28.6 | | | | |
| $R_{23}$ | 149.3 | $D_{23}$ | 3.44 | $N_{14}$ | 1.53358 | $\nu_{14}$ | 51.6 |
| $R_{24}$ | −57.8764 | $D_{24}$ | 3.62 | | | | |

-continued
Numerical Example 1 (FIG. 3)
Focal Length f = 51.3–131.5 F-number: 1:3.5
Image Angle 2ω = 45.8°–18.6°

| Radius of Curvature | | Axial Thickness & Air Separation | | Refractive Index (Nd) | | Abbe Number (νd) | |
|---|---|---|---|---|---|---|---|
| $R_{25}$ | −20.4571 | $D_{25}$ | 1.7 | $N_{15}$ | 1.7725 | $\nu_{15}$ | 49.6 |
| $R_{26}$ | −76.4693 | $D_{26}$ | 0.15 | | | | |
| $R_{27}$ | 67.108 | $D_{27}$ | 3.15 | $N_{16}$ | 1.54739 | $\nu_{16}$ | 53.6 |
| $R_{28}$ | −417.243 | | | | | | |

| Lens Separation during Zooming with Object at Infinity | | | | |
|---|---|---|---|---|
| Setting | Focal Length | D5 | D11 | D14 |
| Wide Angle | 51.3 | 2.1 | 28.026 | 9.5 |
| Intermediate | 90 | 23.195 | 5.672 | 10.76 |
| Telephoto | 131.5 | 34.094 | 2.813 | 2.72 |

Numerical Example 2 (FIG. 5)
Focal Length f = 36.2–102 F-number = 1:3.5
Image Angle 2ω = 61.7°–24°

Figure 5:
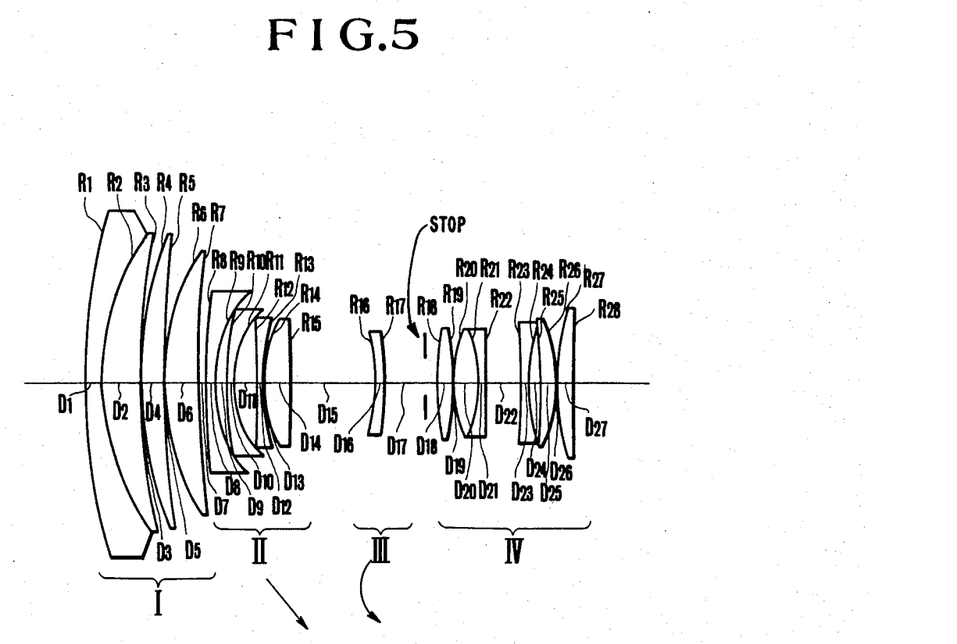
FIG. 5 is a longitudinal sectional view of an Example 2 embodiment of the present invention.

| Radius of Curvature | | Axial Thickness & Air Separation | | Refractive Index (Nd) | | Abbe Number (νd) | |
|---|---|---|---|---|---|---|---|
| $R_1$ | 118.603 | $D_1$ | 2.8 | $N_1$ | 1.80518 | $\nu_1$ | 25.4 |
| $R_2$ | 46.402 | $D_2$ | 6.97 | $N_2$ | 1.65844 | $\nu_2$ | 50.9 |
| $R_3$ | 127.02 | $D_3$ | 0.1 | | | | |
| $R_4$ | 71.531 | $D_4$ | 4.24 | $N_3$ | 1.6968 | $\nu_3$ | 55.5 |
| $R_5$ | 189.422 | $D_5$ | 0.1 | | | | |
| $R_6$ | 46.371 | $D_6$ | 6.26 | $N_4$ | 1.6968 | $\nu_4$ | 55.5 |
| $R_7$ | 173.027 | $D_7$ | Variable | | | | |
| $R_8$ | 220.423 | $D_8$ | 1.6 | $N_5$ | 1.83481 | $\nu_5$ | 42.7 |
| $R_9$ | 23.904 | $D_9$ | 1.81 | | | | |
| $R_{10}$ | 41.883 | $D_{10}$ | 1.5 | $N_6$ | 1.804 | $\nu_6$ | 46.6 |
| $R_{11}$ | 19.011 | $D_{11}$ | 4.6 | | | | |
| $R_{12}$ | −189.831 | $D_{12}$ | 1.3 | $N_7$ | 1.6968 | $\nu_7$ | 55.5 |
| $R_{13}$ | 45.629 | $D_{13}$ | 0.39 | | | | |
| $R_{14}$ | 28.39 | $D_{14}$ | 4.04 | $N_8$ | 1.84666 | $\nu_8$ | 23.9 |
| $R_{15}$ | −6974.39 | $D_{15}$ | Variable | | | | |
| $R_{16}$ | −34.387 | $D_{16}$ | 1.4 | $N_9$ | 1.6968 | $\nu_9$ | 55.5 |
| $R_{17}$ | −91.235 | $D_{17}$ | Variable | | | | |
| $R_{18}$ | 63.15 | $D_{18}$ | 2.92 | $N_{10}$ | 1.6968 | $\nu_{10}$ | 55.5 |
| $R_{19}$ | −63.352 | $D_{19}$ | 0.1 | | | | |
| $R_{20}$ | 28.661 | $D_{20}$ | 4.69 | $N_{11}$ | 1.54072 | $\nu_{11}$ | 47.2 |
| $R_{21}$ | −35.874 | $D_{21}$ | 1.2 | $N_{12}$ | 1.804 | $\nu_{12}$ | 46.6 |
| $R_{22}$ | ∞ | $D_{22}$ | 6.68 | | | | |
| $R_{23}$ | −159.879 | $D_{23}$ | 1.5 | $N_{13}$ | 1.84666 | $\nu_{13}$ | 23.9 |
| $R_{24}$ | 32.418 | $D_{24}$ | 2.3 | | | | |
| $R_{25}$ | −96.759 | $D_{25}$ | 3.07 | $N_{14}$ | 1.60311 | $\nu_{14}$ | 60.7 |
| $R_{26}$ | −27.265 | $D_{26}$ | 0.16 | | | | |
| $R_{27}$ | 42.353 | $D_{27}$ | 3.3 | $N_{15}$ | 1.60311 | $\nu_{15}$ | 60.7 |
| $R_{28}$ | 4211.79 | | | | | | |

| Lens Separation during Zooming with Object at Infinity | | | | |
|---|---|---|---|---|
| Setting | Focal Length | D7 | D15 | D17 |
| Wide Angle | 36.2 | 1.444 | 16.612 | 10.4 |
| Intermediate | 70 | 17.051 | 3.009 | 8.4 |
| Telephoto | 102 | 23.459 | 2.924 | 2.073 |

In the Numerical Examples 1 and 2, Ri is the radius of curvature of the i-th surface counting from the front, Di is the i-th lens thickness or air separation counting from the front, and Ni and Vi are the refractive index and Abbe number of the glass of the i-th lens element counting from the front.

In the numerical Example 1, the stop lies in 1.1 mm ahead of R15 surface with object at infinity, and is moved therefrom to 1.1 mm behind R14 surface when focusing is effected down to an object distance of 1.5 meters measured from R1 surface. And, at this time, the focusing group moves 7 mm forward.

In the numerical Example 2, the stop lies in 0.87 mm ahead of R18 surface with object at infinity, and is moved therefrom to 1.2 mm behind R17 surface when focusing is effected down to an object distance of 1.5 meters measured from R1 surface. And at this time, the focusing group moves 3.3 mm forward.

In these numerical examples of zoom lenses, the heights at which a light ray from the maximum half-angle of view field passes through the surfaces in the focusing lens group, reach a maximum from the optical axis usually when focused to the closest object and when zoomed slightly from the wide angle position toward the telephoto position. Therefore, an effective reduction of the diameter of the focusing lens group can be achieved in the neighborhood of this position, and it is advantageous to employ such construction and arrangement of the lens elements that the air separation in which the stop can move takes the largest value when the zoom lens is set in that neighborhood of the wide angle position.

One method of establishing this feature is to define a power distribution satisfying at least a condition: $f_1 > e - 2f_2$ so that the air separation between the 3rd and 4th lens groups is not extremely widened in the wide angle positions.

This condition also represents the fact that there is a point of position during zooming at which the magnification by the 2nd lens group is unity (namely, $-1X$ magnification in terms of the ratio of the angle at which a parallel light ray from an infinitely distant object is incident on the 2nd lens group with respect to the optical axis, to the angle at which the light ray emerges from the 2nd lens group) and that the 3rd lens group moves at least reciprocatingly during zooming.

Next in connection with the numerical examples 1 and 2 of zoom lenses, the heights from the optical axis at which the light ray of the maximum half-angle of view field passes through each surface in the focusing lens group to the center of the area of the stop are evaluated with the results shown in tables 1 and 2.

Tables 1 and 2 have readings H and H' representative of the above-defined heights evaluated for the wide angle, intermediate and telephoto positions with object at a distance of 1.5 meters and with the stop made stationary, and movable during focusing, respectively.

It will be understood from Tables 1 and 2 that the heights of incidence of the light ray on the lens surfaces R1 to R5 in the focusing lens group all take the maximum values not in the telephoto position but in the wide angle position, and that the forward movement of the stop shortens the diameter of the focusing lens group.

TABLE 1

| Lens Surface | Wide Angle Setting F = 51.3 | | Intermediate Setting f = 90 | | Telephoto Setting f = 131.5 | |
|---|---|---|---|---|---|---|
| | H' | H | H' | H | H' | H |
| R1 | 21.7 | 22.9 | 22.2 | 24.7 | 21.9 | 22.1 |
| R2 | 20.3 | 21.4 | 21.2 | 23.5 | 21.1 | 21.3 |
| R3 | 19.2 | 20.4 | 20.5 | 23.0 | 20.6 | 20.7 |
| R4 | 18.4 | 19.4 | 20.0 | 22.3 | 20.1 | 20.3 |
| R5 | 17.3 | 18.4 | 19.3 | 21.7 | 19.6 | 19.8 |

TABLE 2

| Lens Surface | Wide Angle Setting f = 36.2 | | Intermediate Setting f = 70 | | Telephoto Setting f = 102 | |
|---|---|---|---|---|---|---|
| | H' | H | H' | H | H' | H |
| R1 | 29.3 | 31.7 | 28.3 | 31.1 | 27.1 | 27.1 |
| R2 | 26.3 | 28.2 | 26.3 | 28.7 | 25.6 | 25.6 |
| R3 | 25.7 | 28.0 | 26.0 | 28.6 | 25.3 | 25.3 |
| R4 | 24.7 | 26.8 | 25.5 | 28.1 | 25.0 | 25.0 |
| R5 | 24.1 | 26.5 | 25.2 | 28.0 | 24.7 | 24.7 |
| R6 | 21.2 | 23.1 | 23.2 | 25.6 | 23.3 | 23.3 |
| R7 | 19.7 | 22.0 | 22.5 | 25.3 | 22.7 | 22.7 |

In FIG. 3 there is shown the numerical example 1 of a zoom lens in a mechanical mounting. The figure shows a 1st group I having the focusing function, a member F for moving the 1st lens group, a stop S, a member C supporting the stop S, and a spring B connecting the member F with the member C. In the wide angle position, the air separation between the 3rd lens group III and the 4th lens group IV is so wide that as the focusing lens group I is moved forward, the stop S is moved under the action of the spring B until the member C contacts with the member D. When zoomed to the telephoto position, the 3rd lens group III is moved toward the 4th lens group IV with the result that the air separation between the 3rd and 4th lens groups III and IV is narrowed. Then, when the focusing lens group I is moved forward while pulling the stop S through the spring B, the stop S is caused to move forward but by a very small distance before a part of the member C supporting the stop S contacts the member D holding the 3rd lens group III because of the narrow air region which contains the stop S, and stops in that position. Afterward, the focusing lens group I only is allowed to move forward to focus on the predetermined object.

Figure 4:
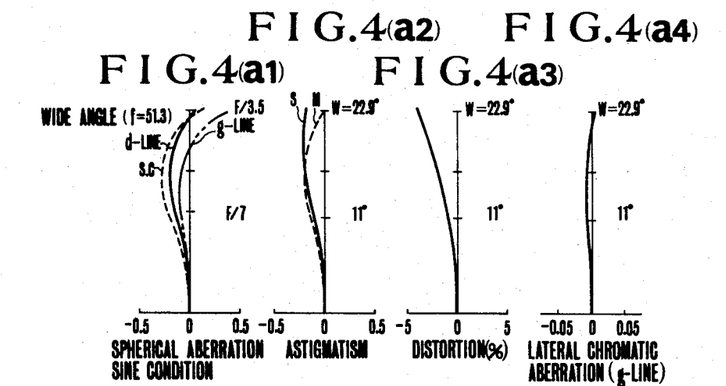
Figure 6:
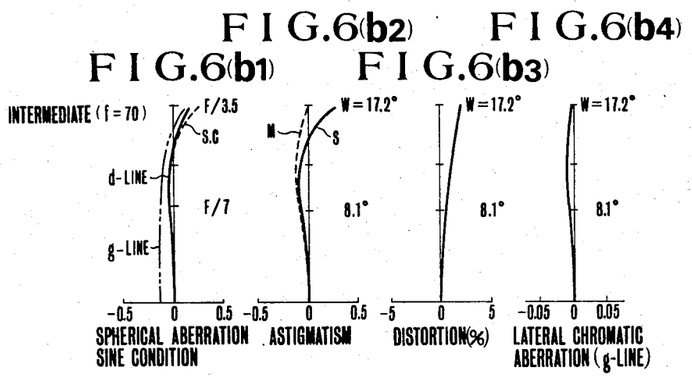

In FIGS. 4(a1)–(a4), (b1)–(b4) and (c1)–(c4) there are shown the various aberrations of the numerical example 1. In FIG. 5 there is shown the numerical example 2 of zoom lens. In FIGS. 6(a1)–(a4), (b1)–(b4) and (c1)–(c4) there are the various aberrations of the numerical example 2. In FIGS. 4 and 6, S denotes the sagittal focus and M the meridional focus. In FIG. 5, I, II, III and IV denote the 1st to 4st lens groups respectively.

What is claimed is:
1. A zoom lens of high grade optical performance comprising:
a first focusing lens group having a lens barrel, a variable magnification optical system and a diaphragm movable along the optical axis from the object side, said variable magnification optical system having a lens group III at the image side, said lens group III having a lens barrel and being movable for variable magnification in such a manner that the distance between the lens group III and the diaphragm is wider at the wide angle position than at the end of the telephoto position,
connecting means, for connecting the diaphragm with the first focusing lens group, said diaphragm being advanced toward the object side in operative engagement with the first focusing lens group when the focusing is changed from an object that is at infinity to an object that is nearby,
movement prohibiting means for controlling the amount of the movement of the diaphragm operatively engaged with the first focusing lens group at another zooming position than the wide angle posi- tion in accordance with the position of the lens group III on the optical axis.

2. A zoom lens of high grade optical performance according to claim 1, wherein
the movement prohibiting means includes a fixed member D provided on a part of the lens barrel of the lens group III.

3. A zoom lens of high grade optical performance according to claim 1, wherein
the connecting means includes a member C for holding the diaphragm, a member F for connecting the member C with the lens barrel of the first focusing lens group and a spring B for connecting the member C with the member F.

4. A zoom lens of high grade optical performance according to claim 1, wherein
the first lens group has a positive refractive power and the variable magnification optical system has a second lens group with a negative refractive power, whereby the relation $f_1 > e - 2f_2$ is satisfied, wherein $f_1$ is the focal length of the first lens, e is the interval between the principal points of the 1st and 2nd groups in the wide angle position.

5. A zoom lens of high grade optical performance according to claim 1, wherein
a fixed lens group is arranged at the image side of the diaphragm.

* * * * *